Patented June 22, 1954

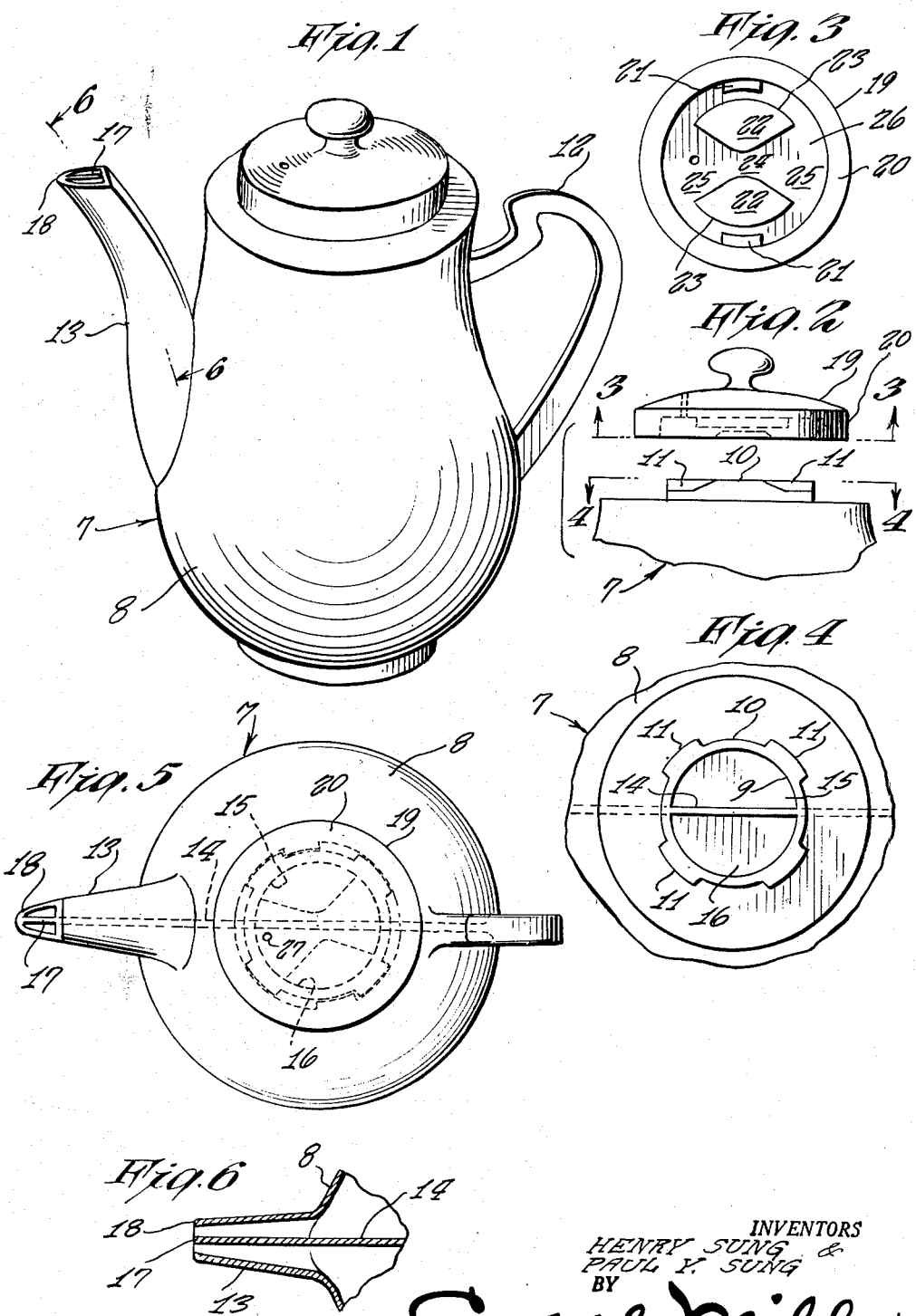

2,681,745

UNITED STATES PATENT OFFICE 2,681,745

PRESSURE RESPONSIVE MULTIPURPOSE POT

Henry Sung and Paul Y. Sung, Bronx, N. Y.

Application February 16, 1952, Serial No. 271,886

2 Claims. (Cl. 222—144.5)

The present invention relates to coffee and tea pots and the like, and particularly to what we choose to term a pressure-responsive multipurpose pot.

The main object of our invention is to provide a pot for holding two or more liquids at the same time which may be selectively poured from the spout thereof without mixing liquids but instead obtaining solely the liquid or beverage selected.

Another object of our invention is to have a multi-purpose pot provided with at least two separate chambers in which tea and water, coffee and cream, or tea and coffee, etc., may be heated and dispensed separately at will.

A further object is to have a multi-purpose pot made of porcelain, metal or any other material that will tolerate heat, the pot having a spout and an intermediate partition that extends throughout the pot and also into the spout.

Yet another object is to have such a special pot that is provided with a removable cover of particular form and construction.

It is also an object of the invention to have a special cover or lid for the pot that co-operates with the pot to allow selection of the beverage to be dispensed by the pot by shifting the cover to one of two or more controlling positions effecting the selection.

A practical object is to have a special pot of the character indicated that is simple in construction and simple to use, and also reasonable in cost to encourage wide distribution on the market.

Other objects and advantages of the invention will appear in further detail as the specification proceeds.

In order to facilitate ready comprehension of this invention for a proper appreciation of the salient features thereof, the invention is illustrated on the accompanying drawing forming part hereof, and in which:

Figure 1 is a perspective view of a pressure-responsive multi-purpose pot made according to the invention and embodying the same in a practical form;

Figure 2 is a fragmentary exploded side elevation of the pot and the cover therefor shown in Figure 1;

Figure 3 is a bottom view of the cover or lid of the pot as seen from line 3—3 in Figure 2;

Figure 4 is a plan or top view of the pot alone as seen from line 4—4 in Figure 2;

Figure 5 is a plan view of the pot and cover assembly as seen from above in Figure 1 and showing the cover rotated into effective position to facilitate dispensing one liquid or beverage from the pot while retaining that in the other portion of the pot intact; and Figure 6 is a transverse fragmentary section as taken on line 6—6 in Figure 1.

Throughout the views, the same reference numerals indicate the same or like parts and features.

It is well known that tea pots, coffee pots and the like contain a chamber for brewing tea or coffee or heating water which may be dispensed from the pot involved through a spout, while a lid or cover is normally used to close the top of the pot. However, it is of course obvious that such a conventional pot can only hold one liquid or beverage at a time, which is a distinct disadvantage in restaurants where many people desire different beverages and are normally served with an individual pot at each table. This has thus presented a problem to which some solution should exist.

Upon considering this problem, it has occurred to us that a tea or coffee pot should be subdivided within to contain two or more separate chambers for containing several liquids out of contact with each other in such manner that they can also be dispensed independently without mixing them. As a result, we have succeeded in producing a special pressure-responsive multi-purpose pot as already outlined, which we shall now proceed to describe in the following.

Hence, in the practice of our invention, and referring also again to the drawing, a pot, generally indicated at 7 primarily includes the hollow body 8 having an upper opening 9 with an upwardly extending flange 10 provided with exterior locking lugs 11, 11, etc. The pot is provided with a handle 12 and upon the opposite side, a spout 13. Within the hollow pot body 8 is provided an integral partition 14 that subdivides the interior into two chambers 15 and 16; this partition has an extension 17 that extends up through the spout 13 to the very extremity 18 thereof. Such complete separation of the two chambers of the pot ensures the complete isolation of any beverage or liquid in one chamber from that in the other even when being poured from the spout 13, so that absolutely no mixing occurs.

In order to control the dispensing of the contents of the two chambers 15 and 16 so as to select which liquid or beverage is to be dispensed alone, a cover or lid 19 of special construction is provided, having an outer flange 20 adapted to surround the flange 10 upon the pot 8 with its locking lugs 11. Within flange 20 are fixed a pair of opposite inwardly directed independent lugs 21, 21 adapted to pass beneath locking lugs 11 of the pot and thereby lock the cover 19 in place on the latter.

Upon the underside or interior of the cover are fixed a pair of substantially triangular block portions 22, 22 with outer arcuate edges 23, 23, providing a groove 24 between them that widens at the two opposite ends into triangular groove portions 25, 25. Preferably, this groove or depressed portion 24, 25 is provided with a rubber or other resilient sheet of material 26 adapted to lie upon flange 10 and partition 14 of the pot 8. This flange 10 and the partition at its top are preferably flush and may also be provided with a sheet of rubber or other resilient material in flat condition. The cover or lid 19 has a small vent 27 in one of the wider portions 25 of groove 24 disposed in such position that when the cover is partly rotated, the block portions 22, 22 extend down into the chambers 15 and 16 sufficiently to prevent complete rotation because these portions engage against partition 14 on either side of the latter. When the cover is rotated to the position indicated in Figure 5, for example, the vent or aperture 27 is located over the chamber 16 so that when the pot is tilted for pouring, air enters this vent to displace liquid in that chamber, allowing the liquid to flow from the same out through spout 13. The rubber lining of groove 24, 25 fits closely upon the pot flange 10 and the partition 14, so that the other chamber 15 is tightly closed without allowing any air to enter or displace liquid therefrom. As a result, no liquid will be dispensed from the chamber 15 while chamber 16 is being drained out of the spout on one side of its partition 17. If the cover is rotated to place the vent over chamber 15, then this chamber may be emptied while chamber 16 remains closed by the cover.

From the foregoing, it is evident that it is easily possible to have a special beverage pot with two or even more separate chambers therein for holding and dispensing two or more beverages or liquid separately therefrom in a selective manner, as desired. The pot may be made large or small and of any desired shape and useful material.

Manifestly, variations may be resorted to, and parts and features may be modified or used without others within the scope of the appended claims.

Having now fully described our invention, we claim:

1. A pressure-responsive multi-purpose pot including a hollow pot body having an upper opening and a spout extending from said hollow pot body and terminating in an open end, a handle upon said pot body, a partition wall within said hollow pot body dividing the interior thereof into two separate chambers, a cover for the upper opening upon the pot body, and means for selectively dispensing liquid from only one chamber at a time through said spout, the said cover having a pair of depending block portions adapted to extend down into the two chambers of the pot body with a flat bottomed groove between said block portions having the outer ends thereof widened to substantially triangular form within the flange of the cover to allow partial rotation only of said cover on the pot body.

2. A multi-purpose pot according to claim 1, wherein the selective dispensing means comprises a resilient lining in the flat bottomed groove, the cover having a vent through the wide portion of the groove and its lining within one end of said groove in a position allowing the vent to be shifted over either chamber within said hollow pot body.

References Cited in the file of this patent

UNITED STATES PATENTS

| Number | Name | Date |
|---|---|---|
| 592,490 | Fangel | Oct. 26, 1897 |
| 703,919 | Harrison | July 1, 1902 |
| 1,025,653 | Sims | May 7, 1912 |
| 1,558,776 | Barratt | Oct. 27, 1925 |
| 2,604,233 | Murphrey | July 22, 1952 |